United States Patent

Berg

[15] 3,697,682

[45] Oct. 10, 1972

[54] VIDEO SIGNAL PROCESSING

[72] Inventor: Anthony David Berg, Englishtown, N.J.

[73] Assignee: Bell Telephone Laboratories, Incorporated, Murray Hill, N.J.

[22] Filed: June 11, 1971

[21] Appl. No.: 152,168

[52] U.S. Cl............178/6.8, 178/DIG. 3, 179/15 BW

[51] Int. Cl.............................H04n 7/12, H04n 7/06

[58] Field of Search.......178/DIG. 3, 5.4 C, 6.8, DIG. 24; 179/15 BW, 15 BM, 15.55 T

[56] References Cited

UNITED STATES PATENTS 1,769,920 7/1930 Gray.....................178/DIG. 3

3,484,544 12/1969 Walker...............178/DIG. 23

*Primary Examiner*—Robert L. Griffin
*Assistant Examiner*—Richard K. Eckert, Jr.
*Attorney*—R. J. Guenther et al.

[57] ABSTRACT

A television picture is scanned such that each frame of the resultant video signal comprises a succession of N interlaced fields. Each field is then delayed by a time equal to the field scan time multiplied by the factor (N-I), where I represents its ordinal place in the succession. The fields, which thus coexist in time, are then interleaved in the frequency domain. The video signal is thereby compressed by a factor of N on a frame-by-frame basis, and additional data can be time multiplexed between the compressed frames. Alternatively, the bandwidth of the signal can be reduced by stretching the time-compressed frames.

9 Claims, 1 Drawing Figure

PATENTED OCT 10 1972 3,697,682
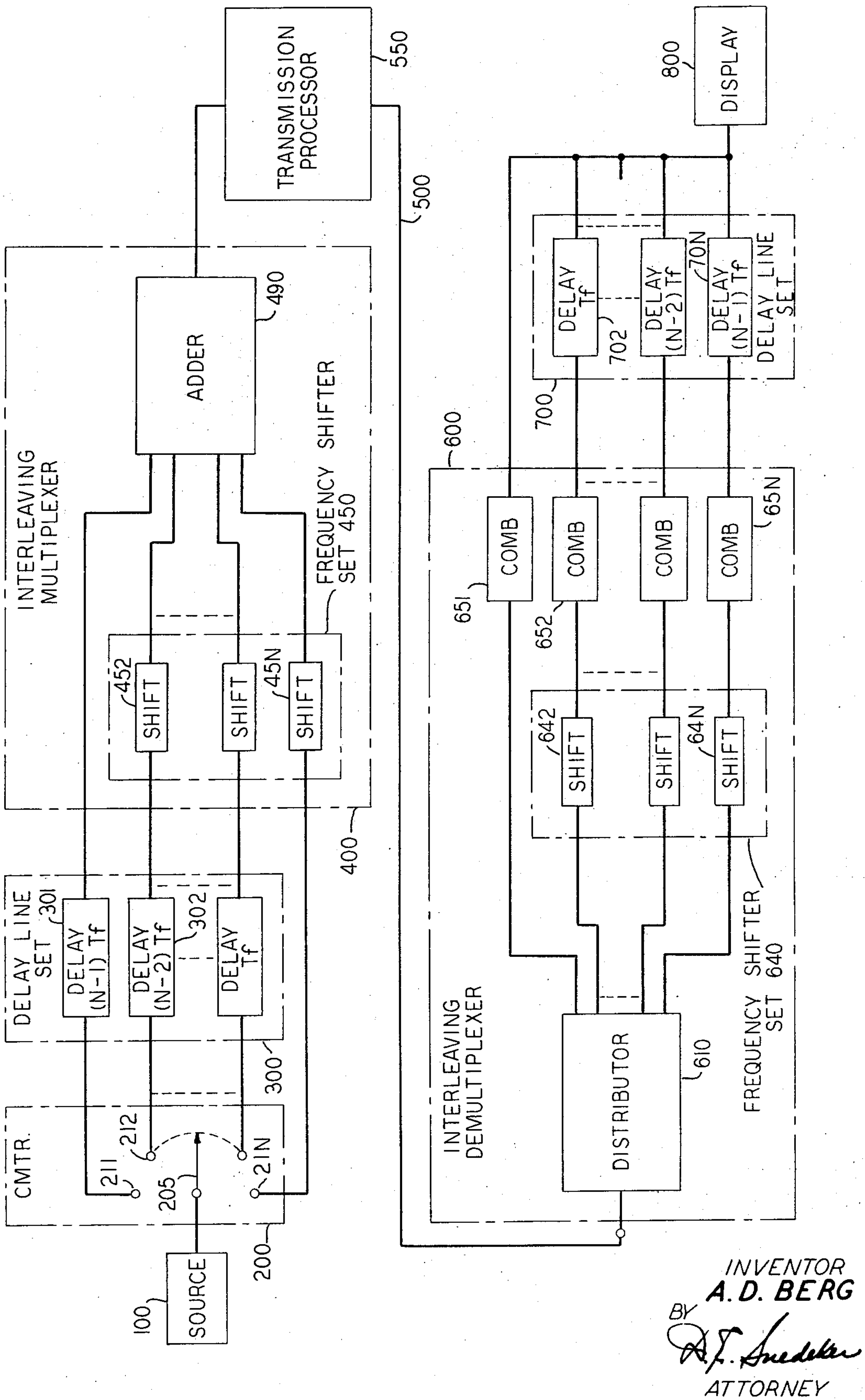
INVENTOR
A. D. BERG
BY
[signature]
ATTORNEY

VIDEO SIGNAL PROCESSING

BACKGROUND OF THE INVENTION

The present invention relates generally to signal processing and particularly to interleaving of video signal spectra.

It is well known that due to its quasi-periodicity, a video signal may be approximated in the frequency domain by a line spectrum, the various components of which are located at the harmonics of the line scan frequency and are separated by relatively empty frequency bands or gaps. This singular characteristic of video signal spectra forms the basis of the multiplexing technique generally known as interleaving. In a typical interleaving system, a first video signal is shifted in the frequency domain by one half its line scan frequency and then algebraically added to a second independent video signal simultaneously scanned at the same frequency. The line components of each signal thus fall at the midpoints of the gaps between the line components of the other. Interleaving of video signal spectra in this manner is an advantageous multiplexing technique because, once interleaved, the two signals together occupy essentially the same bandwidth as theretofore occupied by each separately.

Of course, generally a video signal is not strictly periodic, and thus can only be approximated by a line spectrum. A small percentage of the signal energy is distributed among frequencies which lie in the gaps between the line scan frequency harmonics with most of this gap energy concentrated near the harmonics themselves. Thus, when two signals are interleaved, the small amount of energy present in frequencies at or near the midpoints of the gaps of one signal is combined with the energy clustered about the line components of the other. Consequently, when the two signals are later separated for independent display, some of the energy of one signal may appear in the other, resulting in crosstalk or ghosting.

The crosstalk can be reduced by comb filtering each signal before interleaving so that the energy thereof is confined to passbands centered about each component of the line spectrum. The energy present in the intervening gaps is thus attenuated and the ghosting is reduced. However, loss of the original gap energy through filtering results in some degradation of the picture quality, notably in the vertical resolution. Thus, in known interleaving systems, crosstalk is reduced only with a concomitant reduction in picture quality.

Known arrangements for interleaving more than two video signals are based on an extension of the abovedescribed interleaving principles. In a generalized system in which a plurality of independent video signals are interleaved, the spectra are typically shifted by a different submultiple of the line scan frequency so that the line components of each signal will occupy an exclusive place in the frequency domain. Since the composite interleaved signal occupies no more bandwidth than one of the independent signals thereof, a substantial bandwidth savings over more conventional multiplexing techniques is thereby realized. However, as the number of interleaved signals is increased, the degree of interaction in the gaps also increases and the problems of crosstalk are intensified. The use of more severe filtering to reduce the interaction results in even greater loss of picture resolution.

SUMMARY OF THE INVENTION

It is, therefore, an object of my invention to provide an improved method of video signal processing.

It is a more specific object of my invention to provide an improved method of video signal interleaving in which crosstalk between the interleaved signals is minimized.

It is another object of my invention to increase the number of video signals which can be included within a given bandwidth.

It is a further object of my invention to provide a method of reducing the bandwidth of a video signal.

These and other objects are achieved by a method of video signal processing, according to the present invention, in which the fields of a video frame, individually delayed so that they coexist in time, are frequency interleaved. In a specific embodiment of the invention, in which each frame of a video signal is scanned in a succession of N interlaced fields of equal duration, the first field of each frame is delayed by a time at least as great as the field scan time multiplied by the factor (N-1). Each succeeding field of the frame is delayed by a time equal to the delay time of the preceding field, less the time of one field scan. This delay arrangement causes the respective fields to coexist in time so that they may be interleaved in the frequency domain. Each frame of the interleaved signal contains all of the information of the original signal but exists for only ($1^{th}/N$) as long. That is, the video signal is compressed in time by a factor of N on a frame-by-frame basis with vacant time intervals therebetween. The original video signal may be reconstructed after transmission by extracting the individual fields from their respective time-compressed frames and subsequently resequencing the fields, for example, by appropriate delay thereof.

Since the interlaced fields of a video signal frame are similar to each other, ghosts of one field, when superimposed on another field, are substantially invisible. Thus, advantageously, the crosstalk problems present in known interleaving arrangements are largely avoided.

In accordance with an aspect of the invention, the vacant time intervals between successive compressed frames may be used advantageously to transmit additional data such as a signal containing color information or, in fact, any signal having its energy restricted to time periods no longer than the vacant time intervals between the compressed frames.

In accordance with another aspect of the invention, the bandwidth occupied by a single video signal can be reduced by first compressing the signal on a frame-by-frame basis in the manner described above and then expanding each compressed frame in accordance with known time-expansion techniques.

BRIEF DESCRIPTION OF THE DRAWING

A clear understanding of the invention and of the preceding and other objects and features thereof may be gained from a consideration of the following detailed description and the accompanying drawing which shows an illustrative embodiment of a video signal processing system in accordance with the invention.

DETAILED DESCRIPTION

Video signal source 100 applies to commutator 200 a video signal comprising a series of individual frames of video information. The raster lines of each frame are scanned in an interlaced pattern of N fields, each field having equal time duration $T_f$. Thus, each frame may be regarded as comprising a succession of N fields each of which represents a different group of equi-spaced raster lines. Although N is 2 in most present television systems, the number of fields may be extended beyond 2 by direct extension of the two-field/frame interlacing methods, as is shown, for example, by Glenn M. Glasford in *Fundamentals of Television Engineering*, McGraw Hill, 1955, Chap. 12.

Commutator 200 includes switch 205 and N consecutively numbered terminals 211, 212, through 21N. The first N-1 terminals are respectively connected to corresponding delay lines 301, 302, etc., which collectively comprise delay line set 300. The delay line output leads, as well as terminal 21N, are connected to interleaving multiplexer 400 which illustratively includes frequency shifter set 450 and adder 490, the former comprising N-1 frequency shifters 452 through 45N. In accordance with the invention, the processed signal provided at the output of interleaving multiplexer 400 contains all the video information of the original signal, with the information of each video frame compressed to ($1^{th}$/N) of its original time period, i.e., the period of one field scan.

In operation, switch 205 connects signal source 100 sequentially to terminals 211, 212, through 21N, as each successive field of the video frame being processed is applied to switch 205 from source 100. This mode of operation may be conveniently achieved, for example, by synchronization of the switch via the vertical retrace information contained in the frame. Switch 205 connects source 100 to terminal 211 as each frame begins and thus, the first field of each frame is directed to delay line 301, the second field to delay line 302 and so forth. The $N^{th}$ field, applied directly to interleaving multiplexer 400 via terminal 21N, is not delayed. At the end of each frame, switch 205 returns to terminal 211 for the next frame.

In order for signals to be interleaved in the frequency domain they must, of course, coexist in the time domain. Accordingly, the respective periods of delay provided by delay lines 301, 302, etc., are chosen such that the N fields of each frame are applied to interleaving multiplexer 400 simultaneously. Thus, the first field of each frame is illustratively delayed in delay line 301 for a time (N-1)$T_f$, and each succeeding field is delayed in its respective delay line for a time which is $T_f$ less than the preceding field. In general, each field is delayed by (N-I)$T_f$, where I represents its ordinal place in the succession of fields which comprise a given frame. Thus, it is apparent that although the fields, as applied to commutator 200, succeed each other at intervals of time $T_f$, the first N-1 fields of each frame are delayed in delay line set 300 such that each is applied to interleaving multiplexer 400 at the same time as the $N^{th}$ field of that frame.

The frequency spectra of the fields derived from a single frame of video information have essentially identical energy distributions. That is, each field is substantially characterized by line spectrum components located at harmonics of the common line scan frequency. Accordingly, the fields are readily interleaved by multiplexer 400, the frequency spectra of N-1 of the fields (illustratively the first field is not shifted) being shifted by frequency shifter set 450 such that when the fields are combined in adder 490, the spectral lines of each field lie in the gaps between the spectral lines of the other fields. One known arrangement which may be employed in frequency shifter set 450 for this purpose multiplies each field to be shifted by a sinusoid having a frequency equal to the desired amount of frequency shift. Illustratively, each field is shifted a different submultiple of the line scan frequency (1/N, 2/N, 3/N, etc.,), so that the bandwidth of the multiplexed signal will advantageously be essentially the same as that of the original video signal.

The output signal of interleaving multiplexer 400, is a series of individual frames of video information, as is the signal provided from source 100. However, as a result of the above-described process, the duration of each frame of the processed signal is only that of a single field. In effect, the signal provided by source 100 is compressed in time by a factor of N on a frame-by-frame basis with vacant time intervals between successive compressed frames.

It will be appreciated that the frequency shifting step in the process may precede the delay step with no resultant effect on the interleaved output signal over transmission path 500. Thus delay line set 200 may be connected between frequency shifter set 450 and adder 490 in interleaving multiplexer 400, if desired.

As mentioned above, the original video signal may be reconstructed after transmission by extracting the individual fields from their respective time-compressed frames and resequencing the fields in their original order. In the illustrative embodiment herein, the frames of the compressed video signal transmitted over transmission path 500 are received by interleaving demultiplexer 600 which is the functional inverse of interleaving multiplexer 400. The frames to be demultiplexed are successively applied to distributor 610, which may be an active network, for example, or simply an electrical terminal. Distributor 610, in turn, applied each frame concurrently to the N-1 frequency shifters 642 through 64N of frequency shifter set 640 and to comb filter 651. The N-1 outputs of frequency shifter set 640 are thus applied to comb filters 652 through 65N, along with the one output of distributor 610 applied directly to comb filter 651.

The spectral shifts imparted to the individual signals applied to frequency shifter set 640 are the opposites of the shifts imparted to the various fields of the frame in shifter set 450. Thus, in each of the N signals applied to the comb filters, a different field is positioned in its original frequency domain location; that is, with its components located at harmonics of the line scan frequency. Thus, a different field will be passed unattenuated through each of the N comb filters to the output leads of the demultiplexer.

If desired, an alternative interleaving demultiplexer, in which the comb filters precede the frequency shifters, may be employed in place of demultiplexer 600. In such an arrangement, each comb filter has transmission peaks displaced from the multiples of the line scan frequency such that, the output of each comb filter is a different one of the N fields. Since N-1 of the fields will be displaced in frequency, those fields are thereafter individually shifted so that the harmonics of each are positioned at their original frequency domain locations.

Once separated in interleaving demultiplexer 600, the fields are resequenced in their original order in the frame. Illustratively, the output of comb filter 651 is assumed to be the first field in the succession of fields which comprise the frame being processed. Accordingly, that first field is directly applied to video display 800. The second field in the succession, assumed to be the output of comb filter 652, is delayed by a time $T_f$ in delay line 702 of delay line set 700 and is thus applied to display 800 immediately after the first field. The third field in the succession is delayed by $2T_f$ in delay line 703 and so forth. Thus, each field is applied to the display in the proper sequence within its frame.

Of course, it will be appreciated that the resequencing step in the process may precede either the frequency shifting or comb filtering step in either interleaving demultiplexer 600 or in the above-mentioned alternative interleaving demultiplexer, with no resultant effect on the signal provided to display 800. Thus delay line set 700 may be connected in interleaving demultiplexer 600, for example, between distributor 610 and frequency shifter set 640 or between the frequency shifter set and comb filters 651 through 65N.

It will be appreciated further that transmission channel 500 between interleaving multiplexer 400 and demultiplexer 600 may be advantageously utilized to take advantage of the vacant time intervals in the compressed video signal. Accordingly, transmission path 500 in the drawing illustratively includes transmission processor 550 which may include, for example, time multiplexing apparatus. Thus, for example, the compressed signal can be time multiplexed in processor 550 with color information related to the signal. In fact, the compressed signal can be time multiplexed with any signal having its energy restricted to time periods no longer than the vacant time intervals between compressed frames. A further alternative arrangement is for processor 550 to time multiplex frames from each of N independent video signals which have been compressed in accordance with my invention. The time multiplexed signal produced by such an arrangement would include all the information of N independent video signals but would occupy the same bandwidth and time period as one standard video signal. Therefore, a factor of N bandwidth savings over more conventional multiplexing techniques can be realized.

Known interleaving arrangements in which N signals are directly interleaved, while providing bandwidth savings similar to the present invention, present crosstalk problems. Crosstalk problems are largely avoided in the present invention because the interlaced fields of a video frame are similar to each other and thus ghosts of one field, when superimposed on another field, are, for the most part, invisible.

The above-suggested time multiplexing arrangements are useful where the video information is conveniently transmitted at its original bandwidth. However, sometimes it is desirable to transmit video information at substantially reduced bandwidth. Transmission processor 550 may advantageously include time-expansion circuitry for this purpose, since a signal expanded in the time domain is compressed in the frequency domain by the time expansion factor. Accordingly, the frames of an N field/frame television signal may be first compressed so as to occupy ($1^{th}$/N) their original time period by interleaving their fields in accordance with my invention, and then expanded in processor 550 to reoccupy their original time period, with a resultant factor of N bandwidth reduction. In general, bandwidth reduction by any factor less than or equal to N can be achieved by time-expansion of the video signal by the desired factor. Techniques for expanding a signal in the time domain are well known, and need not be described in detail herein. One possible embodiment of a time-expander operates to digitalize the signal, store it, read out the digital representation at the desired rate and then reconvert to analog form.

Although the preceding discussion has been tacitly directed to monochrome signals, it will be appreciated that frames of standard color signals, in which the luminance and chrominance portions of the frame are, themselves, interleaved, may also be compressed by interleaving successive fields thereof in accordance with my invention. Of course, since the gaps in standard color signals are approximately half as wide as in monochrome signals, the degree of interleaving possible in the former will be less than in the latter.

The preceding detailed description is merely illustrative of the principles of my invention. It is to be understood, for example, that any number of arrangements for interleaving a plurality of signals may be employed in conjunction with my invention without departing from the scope thereof. For example, where N is chosen to be 2, as is the case in most present television systems, my invention may be illustratively implemented in conjunction with an interleaving system such as shown in co-pending application Ser. No. 44,711 filed on June 9, 1970 and assigned to the assignee hereof.

Furthermore, it is to be understood that the various arrangements suggested herein for advantageously using the time intervals between frames of a video signal compressed in time as herein disclosed, are merely illustrative of any number of arrangements which will be obvious to those skilled in the art.

What is claimed is:

1. A method of processing a signal including an ordered succession of N fields each substantially characterized in the frequency domain by a line spectrum having components at harmonics of a common frequency, said method comprising the steps of;

frequency shifting individual ones of said fields such that at least one line spectrum component of each of said fields is located at a frequency between the frequency locations of line spectrum components of another of said fields, delaying individual ones of said fields so that all of said fields coexist in time, and additively combining all of said fields to produce an interleaved signal.

2. A method of processing a signal in accordance with claim 1 further comprising the steps of;

distributing signals corresponding to said interleaved signal, frequency shifting individual ones of said distributed signals such that a different one of said fields in each of said distributed signals is in its original frequency domain location, and separating said different one fields of said distributed signals in their original order.

3. A method of processing a signal in accordance with claim 1 further comprising the step of;

time expanding said interleaved signal, whereby the bandwidth of said signal is reduced in proportion to said time expansion.

4. A method of processing a video frame scanned in a succession of N fields of substantially equal duration, said method comprising the steps of;

delaying the first field of said frame by a time at least as great as the duration of one of said fields multiplied by the factor N-1, delaying each succeeding field of said frame by a time equal to the delay time of the preceding field less the time duration of one of said fields, so that said fields coexist in time, and frequency interleaving said fields, wherein said frequency interleaving step comprises frequency shifting individual ones of said fields and additively combining said fields such that at least one frequency component of each of said fields is located between frequency components of another of said fields.

5. Signal processing apparatus comprising;

a signal source providing a series of information frames, each of said frames comprising an ordered succession of N fields of substantially equal duration, the energy of said frames being distributed substantially at harmonics of a common frequency, means for delaying the first field of each of said frames by a time at least as great as the duration of one of said fields multiplied by the factor N-1, means for delaying each successive field of each of said frames by a time equal to the delay time of the preceding field in the frame less the time duration of one of said fields, so that the fields of each frame coexist in time, and means for frequency interleaving the fields of each frame, whereby said signal is compressed in time by a factor of N on a frame-by-frame basis with vacant time intervals between the compressed frames.

6. Signal processing apparatus in accordance with claim 5 further comprising means for time multiplexing one or more additional signals in said vacant time intervals between said compressed frames.

7. Signal processing apparatus in accordance with claim 5 further comprising means for time-expanding the individual frames of said compressed signal, whereby the bandwidth of said signal is reduced in proportion to said expansion.

8. A signal transmission system comprising;

a signal source providing a series of information frames, each of said frames comprising an ordered succession of N fields of substantially equal duration, the energy of said frames being distributed substantially at harmonics of a common frequency, means for delaying individual ones of said fields in each frame so that all N fields in each frame coexist in time, means for frequency interleaving the N fields of each frame to produce an output signal compressed in time by a factor of N on a frame-by-frame basis with vacant time intervals between the compressed frames, and means for successively reconstructing each frame of said output signal including, means for distributing N signals corresponding to each frame of said output signal, means for frequency shifting individual ones of said N signals to distribute the energy of a different field in each of said N signals substantially at said harmonics of said common frequency, and means for separating said different fields in their original order in their frame.

9. A signal transmission system in accordance with claim 8 wherein said arranging means includes N comb filter means, means for applying said N signals to respective ones of said comb filter means, the output of each of said comb filter means corresponding to a different one of said N fields, and means for ordering said N signals in the order of said N fields.

* * * * *